US006117357A

United States Patent [19]

Kott et al.

[11] Patent Number: 6,117,357

[45] Date of Patent: Sep. 12, 2000

[54] UNSYMMETRICAL ACYCLIC IMIDE BLEACH ACTIVATORS AND COMPOSITIONS EMPLOYING THE SAME

[75] Inventors: Kevin Lee Kott, Cincinnati; Gregory Scot Miracle; Michael Eugene Burns, both of Hamilton, all of Ohio

[73] Assignee: The Procter & Gamble Company, Cincinnati, Ohio

[21] Appl. No.: 09/230,663

[22] PCT Filed: Jul. 25, 1997

[86] PCT No.: PCT/US97/13195

§ 371 Date: Jan. 29, 1999

§ 102(e) Date: Jan. 29, 1999

[87] PCT Pub. No.: WO98/04664

PCT Pub. Date: Feb. 5, 1998

Related U.S. Application Data

[60] Provisional application No. 60/022,786, Jul. 30, 1996, and provisional application No. 60/028,122, Oct. 15, 1996.

[51] Int. Cl.[7] .......... C09K 3/00; C01B 15/10; C11D 3/39; C11D 7/38; C11D 7/54

[52] U.S. Cl. .......... 252/186.38; 510/313

[58] Field of Search .......... 252/186.38, 186.39; 510/313

[56] References Cited

U.S. PATENT DOCUMENTS

| | | | |
|---|---|---|---|
| 2,717,878 | 9/1955 | Malkemus | 510/496 |
| 3,730,902 | 5/1973 | Hilden et al. | 510/368 |
| 3,779,931 | 12/1973 | Fries et al. | 8/111 |
| 3,982,891 | 9/1976 | Murray | 8/111 |
| 4,003,841 | 1/1977 | Hachmann et al. | 106/243 |
| 4,179,390 | 12/1979 | Spadini et al. | 427/213 |
| 4,207,199 | 6/1980 | Perner et al. | 252/186.38 |
| 4,221,675 | 9/1980 | Shirmann et al. | 252/186.38 |
| 4,399,049 | 8/1983 | Gray et al. | 252/186.38 |
| 4,412,934 | 11/1983 | Chung et al. | 252/186.38 |
| 4,745,103 | 5/1988 | Oono et al. | 514/23 |
| 4,772,413 | 9/1988 | Massaux et al. | 252/186.38 |
| 4,851,138 | 7/1989 | Jaroschek et al. | 510/330 |
| 5,106,528 | 4/1992 | Francis et al. | 252/186.23 |
| 5,560,749 | 10/1996 | Madison et al. | 8/111 |

FOREIGN PATENT DOCUMENTS

| | | | |
|---|---|---|---|
| 063017 | 10/1982 | European Pat. Off. | C11D 3/395 |
| 106584 | 4/1984 | European Pat. Off. | C11D 3/39 |
| 163331 | 12/1985 | European Pat. Off. | C11D 3/39 |
| 8/27487 | of 0000 | Japan . | |
| WO 94/18298 | 8/1994 | WIPO | C11D 3/39 |

*Primary Examiner*—Joseph D. Anthony

*Attorney, Agent, or Firm*—C. Brant Cook; Kim William Zerby; Jacobus C. Rasser

[57] ABSTRACT

The invention relates to a bleaching composition comprising:

I) from about 0.1% to about 70.0% by weight of the composition of an unsymmetrical imide bleach activator having the formula:

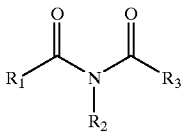

wherein $R_1$ is a $C_7$–$C_{13}$ linear or branched chain saturated or unsaturated alkyl group, $R_2$ is a $C_1$–$C_8$ linear or branched chain saturated or unsaturated alkyl group, and $R_3$ is a $C_1$–$C_4$ linear or branched chain saturated or unsaturated alkyl group; and ii) from about 0.1% to about 70% by weight of the composition of a source of hydrogen peroxide.

13 Claims, No Drawings

UNSYMMETRICAL ACYCLIC IMIDE BLEACH ACTIVATORS AND COMPOSITIONS EMPLOYING THE SAME

CROSS REFERENCE

This application claims priority under Title 35, United States Code 119(e) from Provisional Application Ser. No. 60/022,786 filed Jul. 30, 1996 and Proviaional Application Ser. No. 60/028,122 filed Oct. 15, 1996.

TECHNICAL FIELD

This case relates to unsymmetrical acyclic imide bleach activators, compositions and methods employing the same. In particular, this case relates to bleach additive and bleaching compositions in both liquid and granular form employing unsymmetrical acyclic bleach activators. The activators are particularly useful in laundry, automatic dishwashing and hard surface cleaning compositions.

BACKGROUND OF THE INVENTION

The formulation of bleaching compositions which effectively removes a wide variety of soils and stains from fabrics under wide-ranging usage conditions remains a considerable challenge to the laundry detergent industry. Challenges are also faced by the formulator of hard surface cleaning compositions and automatic dishwashing detergent compositions (ADD's), which are expected to efficiently cleanse and sanitize dishware, often under heavy soil loads. The challenges associated with the formulation of truly effective cleaning and bleaching compositions have been increased by legislation which limits the use of effective ingredients such as phosphate builders in many regions of the world.

Oxygen bleaching agents, such as hydrogen peroxide, have become increasingly popular in recent years in household and personal care products to facilitate stain and soil removal. Bleaches are particularly desirable for their stain-removing, dingy fabric cleanup, whitening and sanitization properties. Oxygen bleaching agents have found particular acceptance in laundry products such as detergents, in automatic dishwashing products and in hard surface cleaners. Oxygen bleaching agents, however, are somewhat limited in their effectiveness. Some frequently encountered disadvantages include color damage on fabrics and surfaces. In addition, oxygen bleaching agents tend to be extremely temperature rate dependent. Thus, the colder the solution in which they are employed, the less effective the bleaching action. Temperatures in excess of 60° C. are typically required for effectiveness of an oxygen bleaching agent in solution.

To solve the aforementioned temperature rate dependency, a class of compounds known as "bleach activators" has been developed. Bleach activators, typically perhydrolyzable acyl compounds having a leaving group such as oxybenzenesulfonate, react with the active oxygen group, typically hydrogen peroxide or its anion, to form a more effective peroxyacid oxidant. It is the peroxyacid compound which then oxidizes the stained or soiled substrate material. However, bleach activators are also somewhat temperature dependent. Bleach activators are more effective at warm water temperatures of from about 40° C. to about 60° C. In water temperatures of less than about 40° C., the peroxyacid compound loses some its bleaching effectiveness.

Numerous substances have been disclosed in the art as effective bleach activators. One widely-used bleach activator is tetraacetyl ethylene diamine (TAED). TAED provides effective hydrophilic cleaning especially on beverage stains, but has limited performance on hydrophobic stains, e.g. dingy, yellow stains such as those resulting from body oils. Another type of activator, such as nonanoyloxybenzenesulfonate (NOBS) and other activators which generally comprise long chain alkyl moieties, is hydrophobic in nature and provides excellent performance on dingy stains. However, many of the hydrophobic activators developed demonstrate limited performance on hydrophilic stains.

The search, therefore, continues for more effective activator materials, especially for those which provide satisfactory performance on both hydrophilic and hydrophobic soils and stains. Improved activator materials should be safe, effective, and will preferably be designed to interact with troublesome soils and stains. Various activators have been described in the literature. Many are esoteric and expensive.

It has now been determined that certain selected bleach activators are unexpectedly effective in removing both hydrophilic and hydrophobic soils and stains from fabrics, hard surfaces and dishes. When formulated as described herein, bleach additive and bleaching compositions are provided using the selected bleach activators to remove soils and stains not only from fabrics, but also from dishware in automatic dishwashing compositions, from kitchen and bathroom hard surfaces, and the like, with excellent results.

BACKGROUND ART

Bleach activators of various types are described in U.S. Pat. Nos. 3,730,902; 4,179,390; 4,207,199; 4,221,675; 4,772,413; 5,106,528; European Patent 063,017; European Patent 106,584; European Patent 163,331; Japanese Patent 08/27487 and PCT Publication W.O. 94/18298. Imide Compounds of various types are disclosed in U.S. Pat. Nos. 4,745,103 and 4,851,138.

SUMMARY OF THE INVENTION

The present invention discloses unsymmetrical acyclic imide bleach activators for use in both solid and liquid additive, bleaching and detergent compositions. The unsymmetrical imide bleach activators of the present invention display the unique ability to form both hydrophilic and hydrophobic bleaching agents in aqueous liquors such as bleaching solutions. Thus, fabrics, hard surfaces or dishes having hydrophobic stains such as dingy and/or hydrophilic stains such as beverages can be effectively cleaned or bleached using the imide bleach activators of the present invention. Accordingly, the imide bleach activators of the present invention provide a unique and superior capability and benefit over the activators of the prior art.

According to a first embodiment of the present invention, a bleach activator compound is provided. The bleach activator of the present invention is an unsymmetrical acyclic imide having the formula:

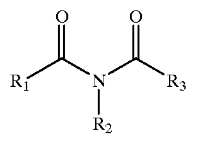

wherein $R_1$ is a $C_7$–$C_{13}$ linear or branched chain saturated or unsaturated alkyl group, preferably a $C_7$–$C_{11}$ linear or branched saturated alkyl group, $R_2$ is a $C_1$–$C_8$, linear or branched chain saturated or unsaturated alkyl group, preferably a $C_1$–$C_4$ linear saturated alkyl group and $R_3$ is a $C_1$–$C_4$ linear or branched chain saturated or unsaturated alkyl group. More preferably, $R_1$ is a $C_7$–$C_{11}$ saturated alkyl group and most preferably, $R_1$ is a linear $C_8$ or $C_9$ saturated alkyl group and $R_2$ and $R_3$ are $CH_3$. Again in preferred situations, the sum of the number of carbon atoms in $R_1$, $R_2$ and $R_3$ is less than 19, more preferably less than 15.

According to another embodiment of the present invention, a bleach additive composition is provided. The additive composition comprises:

i) from about 0.1% to about 70% by weight of the composition of an unsymmetrical imide bleach activator having the formula:

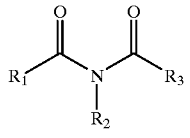

wherein $R_1$ is a $C_7$–$C_{13}$ linear or branched chain saturated or unsaturated alkyl group, preferably a $C_7$–$C_{11}$ linear or branched saturated alkyl group, $R_2$ is a $C_1$–$C_8$, linear or branched chain saturated or unsaturated alkyl group, preferably a $C_1$–$C_4$ linear saturated alkyl group and $R_3$ is a $C_1$–$C_4$ linear or branched chain saturated or unsaturated alkyl group; and, ii) from about 0.1% to about 99.9% by weight of the composition of conventional additive ingredients.

More preferably, $R_1$ is a $C_7$–$C_{11}$ saturated alkyl group and most preferably, $R_1$ is a linear $C_8$ or $C_9$ saturated alkyl group and $R_2$ and $R_3$ are $CH_3$. Again in preferred situations, the sum of the number of carbon atoms in $R_1$, $R_2$ and $R_3$ is less than 19. The conventional additive ingredients may comprise a source of hydrogen peroxide, a surfactant selected from the group consisting of nonionic surfactants, cationic surfactant, anionic surfactants, zwitterionic surfactants, amphoteric surfactants and mixtures thereof, preferably nonionic surfactants and/or be selected from the group consisting of chelating agents, polymeric soil release agents, bleach catalysts, enzymes, builders and mixtures thereof.

Preferably, the bleach additive is in liquid form. When in liquid form, the compositions preferably include from about 0.1% to about 60% by weight of an emulsifying system or a thickening system. The emulsifying system preferably has an HLB value which ranges from about 8 to about 15. Preferably, the emulsifying system comprises one or more nonionic surfactants and most preferably comprises a nonionic surfactant with the nonionic surfactant being a nonionic alkyl ethoxylate.

According to yet another embodiment of the present invention, a bleaching composition is provided. The composition may comprise:

i) from about 0.1% to about 70% by weight of the composition of an unsymmetrical imide bleach activator having the formula:

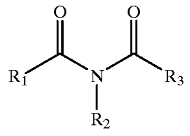

wherein $R_1$ is a $C_7$–$C_{13}$ linear or branched chain saturated or unsaturated alkyl group, preferably a $C_7$–$C_{11}$ linear or branched saturated alkyl group, $R_2$ is a $C_1$–$C_8$, linear or branched chain saturated or unsaturated alkyl group, preferably a $C_1$–$C_4$ linear saturated alkyl group, and $R_3$ is a $C_1$–$C_4$ linear or branched chain saturated or unsaturated alkyl group; and, ii) from about 0.1% to about 70% by weight of the composition of a source of hydrogen peroxide.

More preferably, $R_1$ is a $C_7$–$C_{11}$ saturated alkyl group and most preferably, $R_1$ is a linear $C_8$ or $C_9$ saturated alkyl group and $R_2$ and $R_3$ are $CH_3$. Again in preferred situations, the sum of the number of carbon atoms in $R_1$, $R_2$ and $R_3$ is less than 19. The composition may further comprise from about 0.1% to about 10% by weight of the composition a surfactant selected from the group consisting of nonionic surfactants, cationic surfactants, anionic surfactants, zwitterionic surfactants, amphoteric surfactants and mixtures thereof, preferably nonionic surfactants and/or an ingredient selected from the group consisting of chelating agents, polymeric soil release agents, bleach catalysts, enzymes, builders and mixtures thereof. Preferably, the source of hydrogen peroxide comprises perborate, percarbonate, hydrogen peroxide and mixtures thereof.

The composition may be formulated as a microemulsion of bleach activator in a matrix comprising water, bleach activator, hydrogen peroxide source and a hydrophilic surfactant system comprising a nonionic surfactant. Alternatively, the composition may be formulated as an aqueous emulsion comprising at least a hydrophilic surfactant having an HLB above 10 and at least a hydrophobic surfactant having an HLB up to 9, wherein the bleach activator is emulsified by the surfactants. Alternatively, the composition is formulated in granular form.

According to still another embodiment of the present invention, a method for bleaching soiled fabrics comprising the steps of contacting soiled fabrics to be bleached with an aqueous bleaching liquor, the bleaching liquor including an effective amount of the bleaching composition as described above or with an effective amount of the bleach additive composition as described above and an effective amount of hydrogen peroxide.

Accordingly it is an object of the present invention to provide an unsymmetrical acyclic imide bleach activator which can provide both hydrophobic and hydrophilic bleaching agents. It is another object of the present invention to provide a bleach additive composition, especially in liquid form, containing an unsymmetrical acyclic imide bleach activator. It is still another object of the present invention to provide a bleaching composition, in both solid and liquid forms, containing an unsymmetrical acyclic imide bleach activator and hydrogen peroxide. Lastly, it is an object of the present invention to provide a method for bleaching soiled fabrics using an aqueous liquor containing unsymmetrical acyclic bleach activators. These, and other, objects, features and advantages will be clear from the following detailed description and the appended claims.

All percentages, ratios and proportions herein are on a weight basis unless otherwise indicated. All documents cited herein are hereby incorporated by reference. All viscosities are measured at a shear rate of 10 rpm on a Brookfield viscometer.

DETAILED DESCRIPTION OF THE PREFERRED EMBODIMENT

The present invention relates to unsymmetrical acyclic bleach activators and to solid and liquid compositions employing the unsymmetrical acyclic imide bleach activators. The compositions, both solid and liquid, may include additive, bleaching and detergent compositions and are useful in fabric, dish and hard surface cleaning. The unsymmetrical acyclic imide activators of the present invention have the formula:

(I)

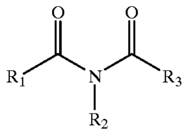

wherein $R_1$ is a $C_7$–$C_{13}$ linear or branched chain saturated or unsaturated alkyl group, $R_2$ is a $C_1$–$C_8$, linear or branched chain saturated or unsaturated alkyl group and $R_3$ is a $C_1$–$C_4$ linear or branched chain saturated or unsaturated alkyl group.

Preferred activators are those in which the $R_1$ is a $C_7$–$C_{11}$ linear or branched saturated alkyl group, more preferably, $R_1$ is a $C_7$–$C_{11}$ saturated alkyl group, $R_2$ is a $C_1$–$C_4$ linear or branched saturated alkyl group and $R_3$ is a $C_1$–$C_4$ linear or branched chain saturated or unsaturated alkyl group. More preferably, $R_2$ and $R_3$ are $C_1$–$C_4$ linear saturated alkyl groups and even more preferably are the same.

Further preferred activators according to the present invention are the N-alkanoyl-N-methyl acetamides. The activators have the formula (I) wherein both $R_2$ and $R_3$ are methyl groups. Thus, N-alkanoyl-N-methyl acetamides have the formula:

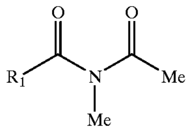

where $R_1$ is $C_7$–$C_{11}$ linear saturated alkyl group. Particularly preferred are N-octanoyl-N-methyl acetamide (when $R_1$ is $C_7$), N-nonanoyl-N-methyl acetamide (when $R_1$ is $C_8$), N-decanoyl-N-methyl acetamide (when $R_1$ is $C_9$) and N-dodecanoyl-N-methyl acetamide (when $R_1$ is $C_{11}$).

Suitable branched chain activators according to the present invention include those of the general formulas:

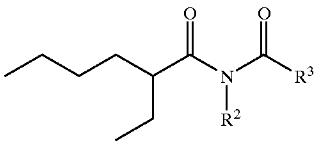

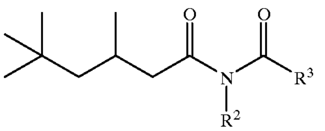

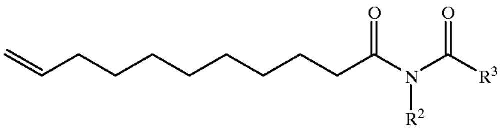

with more prefered branched chain activators including:

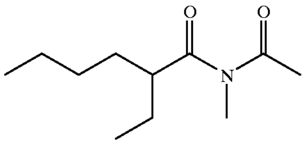

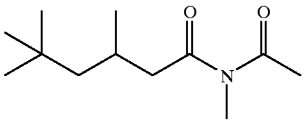

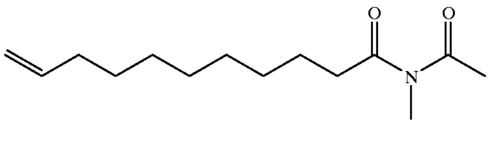

While not wishing to be bound by theory, it is believed that as the number of carbons in the activators of formula (I) increases, the solubility of the compound decreases. Thus, as the activators of the present invention are ideally soluble for optimum performance of the activators, it is preferred that the number of carbon atoms in the activator compound be such that the activator compound displays satisfactory solubility profiles. In the present invention, the sum of the carbons in $R_1$, $R_2$ and $R_3$ is preferably less than 19 and more preferably less than 15.

The unsymmetrical acyclic imide bleach activators of the present invention provide superior bleaching ability and performance over the bleach activators of the prior art. While not wishing to be bound by theory, it is believed that the unsymmetrical acyclic imide bleach activators of the present invention provide both hydrophobic and hydrophilic bleaching agents in aqueous solutions. This is believed to be due to the fact that perhydrolysis can occur at either of the carbonyl groups in the activator. Thus, any molecule of the activators of formula (I) would undergo perhydrolysis in an aqueous solution to form either a bleaching agent ($R_1C(O)OOH$) having hydrophobic properties and a bleaching agent ($R_3C(O)OOH$) having hydrophilic properties when $R_1$ and $R_3$ are defined as above. The bleaching agent may of course be protonated or deprotonated depending upon the in-use pH. A bleaching solution will then include both the hydrophilic bleaching agent and the hydrophobic bleaching agent. Thus, the bleaching capabilities of a mixed activator system (hydrophobic and hydrophilic) and even increased performance can be achieved through the use of a single bleach activator. Elimination of mixed activator systems may provide enormous potential benefits by eliminating the significant expense of an additional bleach activator.

Furthermore, while not wishing to be bound by theory, it is believed that the bleach activators of formula (I) of the present invention are either liquids or wax-like, non-crystalline solids with melting points at or moderately above room temperature. Thus, they are easily handled and processed into liquid formulations. In addition, the activators of the present invention may be easily formulated into stable liquid compositions.

Compositions

Compositions according to the present invention may include liquid, granular and bar compositions in both additive or bleaching composition forms. The compositions are preferably laundry, hard surface cleaning, and automatic dishwashing compositions. Liquid compositions may include those in gel form. Effective bleach additives herein may comprise the unsymmetrical acyclic imide bleach activators of the present invention as described above generally without a hydrogen peroxide source, but preferably include detersive surfactants and one or more members selected from the group consisting of low-foaming automatic dishwashing surfactants, nonionic surfactants, bleach stable thickeners, transition-metal chelants, builders, whitening agents (also known as brighteners) and buffering agents. For bleaching compositions according to the present invention the unsymmetrical acyclic imide bleach activators of the present invention as described above are generally employed in combination with a source of hydrogen peroxide. Levels of bleach activators herein may vary widely, e.g., from about 0.1% to about 90%, by weight of the composition, although lower levels, e.g., from about 0.1% to about 30%, or from about 0.1% to about 20% by weight of the composition are more typically used.

Conventional Additive Ingredients

Source of hydrogen peroxide

Compositions according to the present invention may also include a source of hydrogen peroxide. Asource of hydrogen peroxide herein is any convenient compound or mixture which under consumer use conditions provides an effective amount of hydrogen peroxide. Levels may vary widely and are typically from about 0.1% to about 70%, more typically from about 0.2% to about 40% and even more typically from about 0.5% to about 25%, by weight of the bleaching compositions herein.

The source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Mixtures of any convenient hydrogen peroxide source can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka. The source of hydrogen peroxide and unsymmetrical bleach activator are typically at a ratio of from about 1:3 to about 20:1, as expressed on a basis of peroxide:activator in units of moles $H_2O_2$ delivered by the hydrogen peroxide source to moles bleach activator.

Fully-formulated bleach additive and bleaching compositions, particularly those for use in laundry and automatic dishwashing, typically will also comprise other adjunct ingredients to improve or modify performance. Typical, non-limiting examples of such ingredients are disclosed hereinafter for the convenience of the formulator.

Bleach catalysts

If desired, the bleaches can be catalyzed by means of a bleach catalyst. Preferred are metal containing bleach catalysts such as manganese and cobalt-containing or organic bleach catalysts.

One type of metal-containing bleach catalyst is a catalyst system comprising a transition metal cation of defined bleach catalytic activity, such as copper, iron, titanium, ruthenium tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) S,S-ethylenediamine disuccinic acid and water-soluble salts thereof. Such catalysts are disclosed in U.S. Pat. No. 4,430,243.

Other types of bleach catalysts include the manganese-based complexes disclosed in U.S. Pat. No. 5,246,621 and U.S. Pat. No. 5,244,594. Preferred examples of theses catalysts include $Mn^{IV}_2(u\text{-}O)_3(1,4,7\text{-trimethyl-}1,4,7\text{-triazacyclononane})_2\text{-}(PF_6)_2$ ("MnTACN"), $Mn^{III}_2(u\text{-}O)_1(u\text{-}OAc)_2(1,4,7\text{-trimethyl-}1,4,7\text{-triazacyclononane})_2\text{-}(ClO_4)_2$, $Mn^{IV}_4(u\text{-}O)_6(1,4,7\text{-triazacyclononane})_4\text{-}(ClO_4)_2$, $Mn^{III}Mn^{IV}_4(u\text{-}O)_1(u\text{-}OAc)_2(1,4,7\text{-trimethyl-}1,4,7\text{-triazacyclononane})_2\text{-}(ClO_4)_3$, $Mn^{III}Mn^{IV}_4(u\text{-}O)_2(u\text{-}OAc)_1(1,4,7\text{-trimethyl-}1,4,7\text{-triazacyclononane})_2\text{-}(ClO_4)_3$ and mixtures thereof. See also European patent application publication no. 549,272. Other ligands suitable for use herein include 1,5,9-trimethyl-1,5,9-triazacyclododecane, 2-methyl-1,4,7-triazacyclononane, and mixtures thereof.

The bleach catalysts useful in automatic dishwashing compositions and concentrated powder detergent compositions may also be selected as appropriate for the present invention. For examples of other suitable bleach catalysts herein see U.S. Pat. No. 4,246,612, U.S. Pat. No. 5,227,084 and WO 95/34628, Dec. 21, 1995, the latter relating to particular types of iron catalyst.

See also U.S. Pat. No. 5,194,416 which teaches mononuclear manganese (IV) complexes such as $Mn(1,4,7\text{-trimethyl-}1,4,7\text{-triazacyclononane}(OCH_3)_3\text{—}(PF_6)$.

Still another type of bleach catalyst, as disclosed in U.S. Pat. No. 5,114,606, is a water-soluble complex of manganese (II), (III), and/or (IV) with a ligand which is a non-carboxylate polyhydroxy compound having at least three consecutive C—OH groups. Preferred ligands include sorbitol, iditol, dulsitol, mannitol, xylitol, arabitol, adonitol, meso-erythritol, meso-inositol, lactose, and mixtures thereof.

U.S. Pat. No. 5,114,611 teaches another useful bleach catalyst comprising a complex of transition metals, including Mn, Co, Fe, or Cu, with an non-(macro)-cyclic ligand. Preferred ligands include pyridine, pyridazine, pyrimidine, pyrazine, imidazole, pyrazole, and triazole rings. Optionally, said rings may be substituted with substituents such as alkyl, aryl, alkoxy, halide, and nitro. Particularly preferred is the ligand 2,2'-bispyridylamine. Preferred bleach catalysts include Co-, Cu-, Mn-, or Fe-bispyridylmethane and bispyridylamine complexes. Highly preferred catalysts include $Co(2,2'\text{-bispyridylamine})Cl_2$, Di(isothiocyanato) bispyridylamine-cobalt (II), trisdipyridylamine-cobalt(II) perchlorate, $Co(2,2\text{-bispyridylamine})_2O_2ClO_4$, Bis-(2,2'-bispyridylamine) copper(II) perchlorate, tris(di-2-pyridylamine) iron(II) perchlorate, and mixtures thereof.

Other bleach catalyst examples include Mn gluconate, $Mn(CF_3SO_3)_2$, $Co(NH_3)_5Cl$, and the binuclear Mn complexed with tetra-N-dentate and bi-N-dentate ligands, including $N_4Mn^{III}(u\text{-}O)_2Mn^{IV}N_4)^+$ and $[Bipy2Mn^{III}(u\text{-}O)_2Mn^{IV}bipy_2]\text{—}(ClO_4)_3$.

The bleach catalysts may also be prepared by combining a water-soluble ligand with a water-soluble manganese salt in aqueous media and concentrating the resulting mixture by evaporation. Any convenient water-soluble salt of manganese can be used herein. Manganese (II), (III), (IV) and/or (V) is readily available on a commercial scale. In some instances, sufficient manganese may be present in the wash liquor, but, in general, it is preferred to detergent composition Mn cations in the compositions to ensure its presence in catalytically-effective amounts. Thus, the sodium salt of the ligand and a member selected from the group consisting of $MnSO_4$, $Mn(ClO_4)_2$ or $MnCl_2$ (least preferred) are dissolved in water at molar ratios of ligand:Mn salt in the range of about 1:4 to 4:1 at neutral or slightly alkaline pH. The water may first be de-oxygenated by boiling and cooled by spraying with nitrogen. The resulting solution is evaporated (under $N_2$, if desired) and the resulting solids are used in the bleaching and detergent compositions herein without further purification.

In an alternate mode, the water-soluble manganese source, such as $MnSO_4$, is added to the bleach/cleaning composition or to the aqueous bleaching/cleaning bath which comprises the ligand. Some type of complex is apparently formed in situ, and improved bleach performance is secured. In such an in situ process, it is convenient to use a considerable molar excess of the ligand over the manganese, and mole ratios of ligand:Mn typically are 3:1 to 15:1. The additional ligand also serves to scavenge vagrant metal ions such as iron and copper, thereby protecting the bleach from decomposition. One possible such system is described in European patent application, publication no. 549,271.

While the structures of the bleach-catalyzing manganese complexes have not been elucidated, it may be speculated that they comprise chelates or other hydrated coordination complexes which result from the interaction of the carboxyl and nitrogen atoms of the ligand with the manganese cation. Likewise, the oxidation state of the manganese cation during the catalytic process is not known with certainty, and may be the (+II), (+III), (+IV) or (+V) valence state. Due to the ligands' possible six points of attachment to the manganese cation, it may be reasonably speculated that multi-nuclear species and/or "cage" structures may exist in the aqueous bleaching media. Whatever the form of the active Mn-ligand species which actually exists, it functions in an apparently catalytic manner to provide improved bleaching performances on stubborn stains such as tea, ketchup, coffee, wine, juice, and the like.

Other bleach catalysts are described, for example, in European patent application, publication no. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication no. 224,952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

Preferred are cobalt (III) catalysts having the formula:

$$Co[(NH_3)_nM'_mB'_bT'_tQ_qP_p]Y_y$$

wherein cobalt is in the +3 oxidation state; n is an integer from 0 to 5 (preferably 4 or 5; most preferably 5); M' represents a monodentate ligand; m is an integer from 0 to 5 (preferably 1 or 2; most preferably 1); B' represents a bidentate ligand; b is an integer from 0 to 2; T' represents a tridentate ligand; t is 0 or 1; Q is a tetradentate ligand; q is 0 or 1; P is a pentadentate ligand; p is 0 or 1; and n+m+2b+3t+4q+5p=6; Y is one or more appropriately selected counteranions present in a number y, where y is an integer from 1 to 3 (preferably 2 to 3; most preferably 2 when Y is a −1 charged anion), to obtain a charge-balanced salt, preferred Y are selected from the group consisting of chloride, nitrate, nitrite, sulfate, citrate, acetate, carbonate, and combinations thereof; and wherein further at least one of the coordination sites attached to the cobalt is labile under automatic dishwashing use conditions and the remaining coordination sites stabilize the cobalt under automatic dishwashing conditions such that the reduction potential for cobalt (III) to cobalt (II) under alkaline conditions is less than about 0.4 volts (preferably less than about 0.2 volts) versus a normal hydrogen electrode.

Preferred cobalt catalysts of this type have the formula:

$$[CO(NH_3)_n(M')_m]Y_y$$

wherein n is an integer from 3 to 5 (preferably 4 or 5; most preferably 5); M' is a labile coordinating moiety, preferably selected from the group consisting of chlorine, bromine, hydroxide, water, and (when m is greater than 1) combinations thereof; m is an integer from 1 to 3 (preferably 1 or 2; most preferably 1); m+n=6; and Y is an appropriately selected counteranion present in a number y, which is an integer from 1 to 3 (preferably 2 to 3; most preferably 2 when Y is a −1 charged anion), to obtain a charge-balanced salt.

The preferred cobalt catalyst of this type useful herein are cobalt pentaamine chloride salts having the formula $[Co(NH_3)_5Cl]\ Y_y$, and especially $[Co(NH_3)_5Cl]Cl_2$.

More preferred are the present invention compositions which utilize cobalt (III) bleach catalysts having the formula:

$$[Co(NH_3)_n(M)_m(B)_b]T_y$$

wherein cobalt is in the +3 oxidation state; n is 4 or 5 (preferably 5); M is one or more ligands coordinated to the cobalt by one site; m is 0, 1 or 2 (preferably 1); B is a ligand coordinated to the cobalt by two sites; b is 0 or 1 (preferably 0), and when b=0, then m+n=6, and when b=1, then m=0 and n=4; and T is one or more appropriately selected counteranions present in a number y, where y is an integer to obtain a charge-balanced salt (preferably y is 1 to 3; most preferably 2 when T is a −1 charged anion); and wherein further said catalyst has a base hydrolysis rate constant of less than 0.23 $M^{-1}\ s^{-1}$ (25° C.).

Preferred T are selected from the group consisting of chloride, iodide, $I_3^-$, formate, nitrate, nitrite, sulfate, sulfite, citrate, acetate, carbonate, bromide, $PF_6^-$, $BF_4^-$, $B(Ph)_4^-$, phosphate, phosphite, silicate, tosylate, methanesulfonate, and combinations thereof. Optionally, T can be protonated if more than one anionic group exists in T, e.g., $HPO_4^{2-}$, $HCO_3^-$, $H_2PO_4^-$, etc. Further, T may be selected from the group consisting of non-traditional inorganic anions such as anionic surfactants (e.g., linear alkylbenzene sulfonates (LAS), alkyl sulfates (AS), alkylethoxysulfonates (AES), etc.) and/or anionic polymers (e.g., polyacrylates, polymethacrylates, etc.).

The M moieties include, but are not limited to, for example, $F^-$, $SO_4^{-2}$, $NCS^-$, $SCN^-$, $S_2O_3^{-2}$, $NH_3$, $PO_4^{3-}$, and carboxylates (which preferably are monocarboxylates, but more than one carboxylate may be present in the moiety as long as the binding to the cobalt is by only one carboxylate per moiety, in which case the other carboxylate in the M moiety may be protonated or in its salt form). Optionally, M can be protonated if more than one anionic group exists in M (e.g., $HPO_4^{2-}$, $HCO_3^-$, $H_2PO_4^-$, $HOC(O)CH_2C(O)O$—, etc.) Preferred M moieties are substituted and unsubstituted $C_1$–$C_{30}$ carboxylic acids having the formulas:

RC(O)O— wherein R is preferably selected from the group consisting of hydrogen and $C_1$–$C_{30}$ (preferably $C_1$–$C_{18}$) unsubstituted and substituted alkyl, $C_6$–$C_{30}$ (preferably $C_6$–$C_{18}$) unsubstituted and substituted aryl, and $C_3$–$C_{30}$ (preferably $C_5$–$C_{18}$) unsubstituted and substituted heteroaryl, wherein substituents are selected from the group consisting of —$NR'_3$, —$NR'_4{}^+$, —C(O)OR', —OR', —$C(O)NR'_2$, wherein R' is selected from the group consisting of hydrogen and $C_1$–$C_6$ moieties. Such substituted R therefore include the moieties —$(CH_2)_nOH$ and —$(CH_2)_nNR'_4{}^{30}$ , wherein n is an integer from 1 to about 16, preferably from about 2 to about 10, and most preferably from about 2 to about 5.

Most preferred M are carboxylic acids having the formula above wherein R is selected from the group consisting of hydrogen, methyl, ethyl, propyl, straight or branched $C_4$–$C_{12}$ alkyl, and benzyl. Most preferred R is methyl. Preferred carboxylic acid M moieties include formic, benzoic, octanoic, nonanoic, decanoic, dodecanoic, malonic, maleic, succinic, adipic, phthalic, 2-ethylhexanoic, naphthenoic, oleic, palmitic, triflate, tartrate, stearic, butyric, citric, acrylic, aspartic, fumaric, lauric, linoleic, lactic, malic, and especially acetic acid.

The B moieties include carbonate, di- and higher carboxylates (e.g., oxalate, malonate, malic, succinate, maleate), picolinic acid, and alpha and beta amino acids (e.g., glycine, alanine, beta-alanine, phenylalanine).

Cobalt bleach catalysts useful herein are known, being described for example along with their base hydrolysis rates, in M. L. Tobe, "Base Hydrolysis of Transition-Metal Complexes", *Adv. Inorg. Bioinorg. Mech.,* (1983), 2, pages 1–94. For example, Table 1 at page 17, provides the base hydrolysis rates (designated therein as $k_{OH}$) for cobalt pentaamine catalysts complexed with oxalate ($k_{OH}$=2.5×$10^{-4}$ $M^{-1}$ $s^{-1}$ (25° C.)), $NCS^-$ ($k_{OH}$=5.0×10–4 $M^{-1}$ $s^{-1}$ (25° C.)), formate ($k_{OH}$=5.8×$10^{-4}$ $M^{-1}$ $s^{-1}$ (25° C.)), and acetate ($k_{OH}$=9.6×$10^{-4}$ $M^{-1}$ $s^{-1}$ (25° C.)). The most preferred cobalt catalyst useful herein are cobalt pentaamine acetate salts having the formula $[Co(NH_3)_5OAc]T_y$, wherein OAc represents an acetate moiety, and especially cobalt pentaamine acetate chloride, $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co$—$(NH_3)_5OAc](BF_4)_2$; and $[Co(NH_3)_5OAc](NO_3)_2$ (herein "PAC").

These cobalt catalysts are readily prepared by known procedures, such as taught for example in the Tobe article hereinbefore and the references cited therein, in U.S. Pat. No. 4,810,410, to Diakun et al, issued Mar. 7, 1989, *J. Chem. Ed.* (1989), 66 (12), 1043–45; The Synthesis and Characterization of Inorganic Compounds, W. L. Jolly (Prentice-Hall; 1970), pp. 461–3; *Inorg. Chem.,* 18, 1497–1502 (1979); *Inorg. Chem.,* 21, 2881–2885 (1982); *Inorg. Chem.,* 18, 2023–2025 (1979); Inorg. Synthesis, 173–176 (1960); and *Journal of Physical Chemistry,* 56, 22–25 (1952); as well as the synthesis examples provided hereinafter.

These catalysts may be coprocessed with adjunct materials so as to reduce the color impact if desired for the aesthetics of the product, or to be included in enzyme-containing particles as exemplified hereinafter, or the compositions may be manufactured to contain catalyst "speckles".

Organic bleach catalysts may also be employed in the present invention. Organic bleach catalysts are known and include imine compounds and their precursors as disclosed in U.S. Pat. Nos. 5,360,568, 5,360,569, and 5,370,826, the disclosures of which are all herein incorporated by reference and the sulfonyl imine compounds, their precursors and bleaching agents as disclosed in U.S. Pat. Nos. 5,041,232, 5,045,223, 5,047,163, 5,310,925, 5,413,733, 5,429,768 and 5,463,115 the disclosures of which are all herein incorporated by reference.

Particularly preferred organic bleach catalysts include quaternary imine compounds of the general structure:

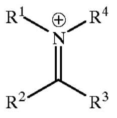

where $R^1$–$R^4$ may be a hydrogen or an unsubstituted or substituted radical selected from the group consisting of phenyl, aryl, heterocyclic ring, alkyl and cycloalkyl radicals except that at least one of $R^1$–$R^4$ contains an anionically charged moiety.

More preferred organic catalysts have an anionically charged moiety bonded to the quaternary nitrogen and are represented by the formula:

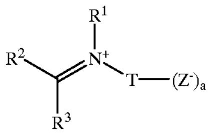

wherein:

$R^1$–$R^3$ are moieties having a total charge of from about 0 to about −1;

$R^1$–$R^3$ may be a hydrogen or an unsubstituted or substituted radical selected from the group consisting of phenyl, aryl, heterocyclic ring, alkyl and cycloalkyl radicals;

T is selected from the group consisting of: —$(CH_2)_b$— wherein b is from about 1 to about 8, —$(CH(R^5))$— wherein $R^5$ is $C_1$–$C_8$ alkyl, —$CH_2(C_6H_4)$—,

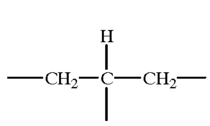 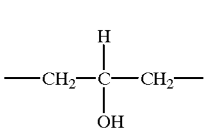

and —$(CH_2)_d(E)(CH_2)_f$— wherein d is from 2 to 8, f is from 1 to 3 and E is —C(O)O—, —$C(O)NR^6$ or

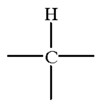

wherein $R^6$ is H or $C_1$–$C_4$ alkyl.

Z is covalently bonded to T and is selected from the group consisting of —$CO_2^-$, —$SO_3^-$ and —$OSO_3$— and a is at least 1. Accordingly, as Z is covalently bonded to T (when the total charge on $R^1$–$R^3$ is zero), the quaternary imine is either a zwitterion when a is 1 or a polyion having a net negative charge when a is greater than 1.

An even more preferred organic catalyst is an aryliminium zwitterion, an aryliminium polyion having a net negative charge of about −1 to about −3 or mixtures thereof. In this preferred embodiment, $R^1$ and $R^2$ together form part of a common ring. In particular, $R^1$ and $R^2$ together may form one or more five-membered, six-membered or seven-membered rings. The most preferred aryliminums are created from the non-charged moiety:

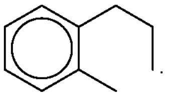

Accordingly, the preferred aryliminium zwitterions involve $R^1$ and $R^2$ together forming the non-charged moiety (III) with T being selected from the group consisting of $—(CH_2)_b—$ wherein b is from about 1 to about 6, $—(CH(R^5))—$ wherein $R^5$ is methyl, and $—CH_2(C_6H_4)—$, with a being 1 and Z being selected from $CO_2^-$ and $—SO_3^-$. More preferably, the aryliminium zwitterion of the present invention has $R^1$ and $R^2$ together forming the non-charged moiety (III) with T being $—(CH_2)_b—$ or $—CH_2(C_6H_4)—$, with a being 1, Z being $—SO_3^-$ and b being from 2 to 4. The most preferred aryliminium zwitterions are represented by the formula:

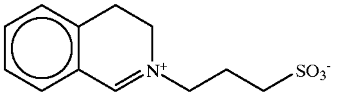

or

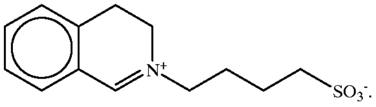

3-(3,4-dihydroisoquinolinium)propane sulfonate 4-(3,4-dihydroisoquinolinium)butane sulfonate As a practical matter, and not by way of limitation, the cleaning compositions and cleaning processes herein can be adjusted to provide on the order of at least one part per hundred million of the active bleach catalyst species in the aqueous washing medium, and will preferably provide from about 0.01 ppm to about 25 ppm, more preferably from about 0.05 ppm to about 10 ppm, and most preferably from about 0.1 ppm to about 5 ppm, of the bleach catalyst species in the wash liquor. In order to obtain such levels in the wash liquor of an automatic dishwashing process, typical automatic dishwashing compositions herein will comprise from about 0.0005% to about 0.2%, more preferably from about 0.004% to about 0.08%, of bleach catalyst by weight of the cleaning compositions.

Conventional Bleach Activators

Compositions of the present invention may also include, in addition to the unsymmetrical acyclic imide bleach activators, a conventional bleach activator. "Conventional bleach activators" herein are any bleach activators which do not respect the above-identified provisions in defining the unsymmetrical acyclic imide bleach activators herein. Numerous conventional bleach activators are known and are optionally included in the instant bleaching compositions. Various nonlimiting examples of such activators are disclosed in U.S. Pat. No. 4,915,854, issued Apr. 10, 1990 to Mao et al, and U.S. Pat. No. 4,412,934. The nonanoyloxybenzene sulfonate (NOBS) and tetraacetyl ethylenediamine (TAED) activators are typical, and mixtures thereof can also be used. See also U.S. Pat. No. 4,634,551 for other typical conventional bleach activators. Known amido-derived bleach activators are those of the formulae: $R^1N(R^5)C(O)R^2C(O)L$ or $R^1C(O)N(R^5)R^2C(O)L$ wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. Further illustration of optional, conventional bleach activators of the above formulae include (6-octanamido-caproyl) oxybenzenesulfonate, (6-nonanamidocaproyl) oxybenzenesulfonate, (6-decanamidocaproyl) oxybenzenesulfonate, and mixtures thereof as described in U.S. Pat. No. 4,634,551. Another class of conventional bleach activators comprises the benzoxazin-type activators disclosed by Hodge et al in U.S. Pat. No. 4,966,723, issued Oct. 30, 1990. Examples of optional lactam activators include octanoyl caprolactam, 3,5,5-trimethylhexanoyl caprolactam, nonanoyl caprolactam, decanoyl caprolactam, undecenoyl caprolactam, octanoyl valerolactam, decanoyl valerolactam, benzoyl caprolactam, nitrobenzoyl caprolactam, undecenoyl valerolactam, nonanoyl valerolactam, 3,5,5-trimethylhexanoyl valerolactam and mixtures thereof.

Bleaching agents other than hydrogen peroxide sources are also known in the art and can be utilized herein as adjunct ingredients. One type of non-oxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from about 0.025% to about 1.25%, by weight, of such bleaches, especially sulfonated zinc phthalocyanine.

Organic Peroxides, especially Diacyl Peroxides—are extensively illustrated in Kirk Othmer, Encyclopedia of Chemical Technology, Vol. 17, John Wiley and Sons, 1982 at pages 27–90 and especially at pages 63–72, all incorporated herein by reference. Suitable organic peroxides, especially diacyl peroxides, are further illustrated in "Initiators for Polymer Production", Akzo Chemicals Inc., Product Catalog, Bulletin No. 88-57, incorporated by reference. Preferred diacyl peroxides herein whether in pure or formulated form for granule, powder or tablet forms of the bleaching compositions constitute solids at 25° C. , e.g., CADET® BPO 78 powder form of dibenzoyl peroxide, from Akzo. Highly preferred organic peroxides, particularly the diacyl peroxides, for such bleaching compositions have melting points above 40° C., preferably above 50° C. Additionally, preferred are the organic peroxides with SADT's (as defined in the foregoing Akzo publication) of 35° C. or higher, more preferably 70° C. or higher. Nonlimiting examples of diacyl peroxides useful herein include dibenzoyl peroxide, lauroyl peroxide, and dicumyl peroxide. Dibenzoyl peroxide is preferred. In some instances, diacyl peroxides are available in the trade which contain oily substances such as dioctyl phthalate. In general, particularly for automatic dishwashing applications, it is preferred to use diacyl peroxides which are substantially free from oily phthalates since these can form smears on dishes and glassware.

Quaternary Substituted Bleach Activators—The present compositions can optionally further comprise conventional, known quaternary substituted bleach activators (QSBA). QSBA's are further illustrated in U.S. Pat. No. 4,539,130, Sep. 3, 1985 and U.S. Pat. No. 4,283,301. British Pat. 1,382,594, published Feb. 5, 1975, discloses a class of QSBA's optionally suitable for use herein. U.S. Pat. No. 4,818,426 issued Apr. 4, 1989 discloses another class of QSBA's. Also see U.S. Pat. No. 5,093,022 issued Mar. 3, 1992 and U.S. Pat. No. 4,904,406, issued Feb. 27, 1990. Additionally, QSBA's are described in EP 552,812 A1 published Jul. 28, 1993, and in EP 540,090 A2, published May 5, 1993. Multi-quaternary bleach activators as disclosed in U.S. Pat. No. 5,460,747 may also be employed.

Preformed Peracids

The activators of the present invention may of course be used in conjunction with a preformed peracid compound selected from the group consisting of percarboxylic acids and salts, percarbonic acids and salts, perimidic acids and salts, peroxymonosulfuric acids and salts, and mixtures thereof. One class of suitable organic peroxycarboxylic acids have the general formula:

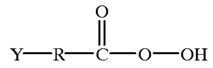

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Organic peroxyacids suitable for use in the present invention can contain either one or two peroxy groups and can be either aliphatic or aromatic. When the organic peroxycarboxylic acid is aliphatic, the unsubstituted acid has the general formula:

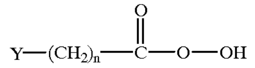

where Y can be, for example, H, $CH_3$, $CH_2Cl$, C(O)OH, or C(O)OOH; and n is an integer from 1 to 20. When the organic peroxycarboxylic acid is aromatic, the unsubstituted acid has the general formula:

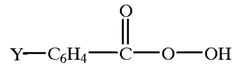

wherein Y can be, for example, hydrogen, alkyl, alkylhalogen, halogen, C(O)OH or C(O)OOH.

Typical monoperoxy acids useful herein include alkyl and aryl peroxyacids such as:

(i) peroxybenzoic acid and ring-substituted peroxybenzoic acid, e.g. peroxy-a-naphthoic acid, monoperoxyphthalic acid (magnesium salt hexahydrate), and o-carboxybenzamidoperoxyhexanoic acid (sodium salt);

(ii) aliphatic, substituted aliphatic and arylalkyl monoperoxy acids, e.g. peroxylauric acid, peroxystearic acid, N-nonanoylaminoperoxycaproic acid (NAPCA), N,N-(3-octylsuccinoyl)aminoperoxycaproic acid (SAPA) and N,N-phthaloylaminoperoxycaproic acid (PAP);

(iii) amidoperoxyacids, e.g. monononylamide of either peroxysuccinic acid (NAPSA) or of peroxyadipic acid (NAPAA).

Typical diperoxyacids useful herein include alkyl diperoxyacids and aryldiperoxyacids, such as:

(iv) 1,12-diperoxydodecanedioic acid;

(v) 1,9-diperoxyazelaic acid;

(vi) diperoxybrassylic acid; diperoxysebacic acid and diperoxyisophthalic acid;

(vii) 2-decyldiperoxybutane-1,4-dioic acid;

(viii) 4,4'-sulfonylbisperoxybenzoic acid.

Detersive Surfactant

The compositions of the present invention may include a detersive surfactant. The detersive surfactant may comprise from about 1%, to about 99.8%, by weight of the composition depending upon the particular surfactants used and the effects desired. More typical levels comprise from about 5% to about 80% by weight of the composition.

The detersive surfactant can be nonionic, anionic, ampholytic, zwitterionic, or cationic. Mixtures of these surfactants can also be used. Preferred detergent compositions comprise anionic detersive surfactants or mixtures of anionic surfactants with other surfactants, especially nonionic surfactants.

Nonlimiting examples of surfactants useful herein include the conventional $C_{11}$–$C_{18}$ alkyl benzene sulfonates and primary, secondary and random alkyl sulfates, the $C_8$–$C_{18}$ alkyl alkoxy sulfates, the $C_8$–$C_{18}$ alkyl polyglycosides and their corresponding sulfated polyglycosides, $C_8$–$C_{18}$ alpha-sulfonated fatty acid esters, $C_8$–$C_{18}$ alkyl and alkyl phenol alkoxylates (especially ethoxylates and mixed ethoxy/propoxy), $C_8$–$C_{18}$ betaines and sulfobetaines ("sultaines"), $C_8$–$C_{18}$ amine oxides, such as branched or unbranched aliphatic N,N-dimethyl-N-oxides and the like. Other conventional useful surfactants are listed in standard texts such as Surfactants in Consumer Products; Theory, Technology and Application, J. Falbe, ed. Springer-Verlag 1987 and Handbook of Surfactants, M. R. Porter, Blackie & Son, 1991.

One class of nonionic surfactant particularly useful in detergent compositions of the present invention is condensates of ethylene oxide with a hydrophobic moiety to provide a surfactant having an average hydrophilic-lipophilic balance (HLB) in the range of from 5 to 17, preferably from 6 to 16, more preferably from 7 to 15. The hydrophobic (lipophilic) moiety may be aliphatic or aromatic in nature. The length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_8$–$C_{15}$ primary alcohol ethoxylates containing 3–12 moles of ethylene oxide per mole of alcohol, particularly the $C_{14}$–$C_{15}$ primary alcohols containing 6–8 moles of ethylene oxide per mole of alcohol, the $C_{12}$–$C_{15}$ primary alcohols containing 3–5 moles of ethylene oxide per mole of alcohol, the $C_9$–$C_{11}$ primary alcohols containing 8–12 moles of ethylene oxide per mole of alcohol, and mixtures thereof. Suitable ethoxylated fatty alcohol nonionic surfactants for use in the present invention are commercially available under the tradenames DOBANOL and NEODOL available from the Shell Oil Company of Houston, Tex.

Another suitable class of nonionic surfactants comprises the polyhydroxy fatty acid amides of the formula:

$$R^2C(O)N(R^1)Z$$

wherein: $R_1$ is H, $C_1$–$C_9$ hydrocarbyl, 2-hydroxyethyl, 2-hydroxypropyl, or a mixture thereof, preferably $C_1$–$C_4$ alkyl, more preferably $C_1$ or $C_2$ alkyl, most preferably $C_1$ alkyl (i.e., methyl); and $R^2$ is a $C_5$–$C_{32}$ hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Z is a polyhydroxyhydrocarbyl moiety having a linear hydrocarbyl chain with at least 2 (in the case of glyceraldehyde) or at least 3 hydroxyls (in the case of other reducing sugars) directly connected to the chain, or an alkoxylated derivative (preferably ethoxylated or propoxylated) thereof. Z preferably will be derived from a reducing sugar in a reductive amination reaction; more preferably Z is a glycityl moiety. Suitable reducing sugars include glucose, fructose, maltose, lactose, galactose, mannose, and xylose, as well as glyceraldehyde. As raw materials, high dextrose corn syrup, high fructose corn syrup, and high maltose corn syrup can be utilized as well as the individual sugars listed above. These corn syrups may yield a mix of sugar components for Z. It should be understood that it is by no means intended to exclude other suitable raw materials. Z preferably will be selected from the group consisting of $-CH_2-(CHOH)_n-CH_2OH$, $-CH(CH_2OH)-(CHOH)_{n-1}-CH_2OH$, $-CH_2-(CHOH)_2(CHOR')(CHOH)-CH_2OH$, where n is an integer from 1 to 5, inclusive, and R' is H or a cyclic mono- or polysaccharide, and alkoxylated derivatives thereof. Most preferred are glycityls wherein n is 4, particularly $-CH_2-(CHOH)_4-CH_2OH$.

In Formula (I), $R^1$ can be, for example, N-methyl, N-ethyl, N-propyl, N-isopropyl, N-butyl, N-isobutyl, N-2-hydroxy ethyl, or N-2-hydroxy propyl. For highest sudsing, $R^1$ is preferably methyl or hydroxyalkyl. If lower sudsing is desired, $R^1$ is preferably $C_2$–$C_9$ alkyl, especially n-propyl, iso-propyl, n-butyl, iso-butyl, pentyl, hexyl and 2-ethyl hexyl.

$R^2$—CO—N< can be, for example, cocamide, stearamide, oleamide, lauramide, myristamide, capricamide, palmitamide, tallowamide, etc.

Builders

Detergent builders can optionally be included in the compositions herein to assist in controlling mineral hardness. Inorganic as well as organic builders can be used. Builders are typically used in automatic dishwashing and fabric laundering compositions to assist in the removal of particulate soils.

The level of builder can vary widely depending upon the end use of the composition and its desired physical form. When present, the compositions will typically comprise at least about 1% builder. High performance compositions typically comprise from about 10% to about 80%, more typically from about 15% to about 50% by weight, of the detergent builder. Lower or higher levels of builder, however, are not excluded.

Inorganic or P-containing detergent builders include, but are not limited to, the alkali metal, ammonium and alkanolammonium salts of polyphosphates (exemplified by the tripolyphosphates, pyrophosphates, and glassy polymeric metaphosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders. See U.S. Pat. No. 4,605,509 for examples of preferred aluminosilicates.

Examples of silicate builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6® is a crystalline layered silicate marketed by Hoechst (commonly abbreviated herein as "SKS-6"). Unlike zeolite builders, the Na SKS-6 silicate builder does not contain aluminum. NaSKS-6 is the δ-$Na_2SiO_5$ morphology form of layered silicate and can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1}.yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the α-, β- and γ-forms. Other silicates may also be useful, such as for example magnesium silicate, which can serve as a crispening agent in granular formulations, as a stabilizing agent for oxygen bleaches, and as a component of suds control systems.

Silicates useful in automatic dishwashing (ADD) applications include granular hydrous 2-ratio silicates such as BRITESIL® H20 from PQ Corp., and the commonly sourced BRITESIL® H24 though liquid grades of various silicates can be used when the ADD composition has liquid form. Within safe limits, sodium metasilicate or sodium hydroxide alone or in combination with other silicates may be used in an ADD context to boost wash pH to a desired level.

Examples of carbonate builders are the alkaline earth and alkali metal carbonates as disclosed in German Patent Application No. 2,321,001 published on Nov. 15, 1973. Various grades and types of sodium carbonate and sodium sesquicarbonate may be used, certain of which are particularly useful as carriers for other ingredients, especially detersive surfactants.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula: $[M_z(zAlO_2)_y].xH_2O$ wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula: $Na_{12}[(AlO_2)_{12}(SiO_2)_{12}].xH_2O$ wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter. As with other builders such as carbonates, it may be desirable to use zeolites in any physical or morphological form adapted to promote surfactant carrier function, and appropriate particle sizes may be freely selected by the formulator.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt or "overbased". When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty laundry detergent formulations due to their availability from renewable resources and their biodegradability. Citrates can also be used in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used. However, in general, phosphorous-based builders are not desired.

Chelating Agents

The compositions herein may also optionally contain one or more heavy metal chelating agents, such as diethylenetriaminepentaacetic acid (DTPA). More generally, chelating agents suitable for use herein can be selected from the group consisting of aminocarboxylates, aminophosphonates, polyfunctionally-substituted aromatic chelating agents and mixtures thereof. Without intending to be bound by theory, it is believed that the benefit of these materials is due in part to their exceptional ability to remove heavy metal ions from washing solutions by formation of soluble chelates; other benefits include inorganic film or scale prevention. Other suitable chelating agents for use herein are the commercial DEQUEST® series, and chelants from Monsanto, DuPont, and Nalco, Inc.

Aminocarboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriamine-pentaacetates, and ethanoldiglycines, alkali metal, ammonium, and substituted ammonium salts therein and mixtures therein.

Aminophosphonates are also suitable for use as chelating agents in the compositions of the invention when at least low levels of total phosphorus are permitted in detergent compositions, and include ethylenediaminetetrakis (methylenephosphonates). Preferably, these aminophosphonates do not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A highly preferred biodegradable chelator for use herein is ethylenediamine disuccinate ("EDDS"), especially (but not limited to) the [S,S] isomer as described in U.S. Pat. No. 4,704,233, Nov. 3, 1987, to Hartman and Perkins. The trisodium salt is preferred though other forms, such as magnesium salts, may also be useful.

If utilized, these chelating agents or transition-metal-selective sequestrants will preferably comprise from about 0.001% to about 10%, more preferably from about 0.05% to about 1% by weight of the bleaching compositions herein.

Polymeric Soil Release Agent

Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate), having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, and such cellulose derivatives are amphiphilic, whereby they have a sufficient level of $C_1$–$C_4$ alkyl ether and/or $C_4$ hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b).

Typically, the polyoxyethylene segments of (a)(i) will have a degree of polymerization of from about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful in the present invention also include cellulosic derivatives such as hydroxyether cellulosic polymers, copolymeric blocks of ethylene terephthalate or propylene terephthalate with polyethylene oxide or polypropylene oxide terephthalate, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units containing 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoaroyl, end-capped terephthalate esters.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)ethanesulfonate. These sulfo-end-capeed soil release agents also comprise from about 0.5% to about 20%, by weight of the oligomer, of a crystalline-reducing stabilizer, preferably selected from the group consisting of xylene sulfonate, cumene sulfonate, toluene sulfonate, and mixtures thereof.

If utilized, soil release agents will typically comprise from about 0.01% to about 10.0%, by weight, of the detergent compositions herein, typically from about 0.1% to about 5%, preferably from about 0.2% to about 3.0%.

Enzymes

Enzymes can be included in the formulations herein for a wide variety of fabric laundering or other cleaning purposes, including removal of protein-based, carbohydrate-based, or triglyceride-based stains, for example, and for the prevention of refugee dye transfer, and for fabric restoration. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders, etc. In this respect bacterial or fungal enzymes are preferred, such as bacterial amylases and proteases, and fungal cellulases.

Enzymes are normally incorporated at levels sufficient to provide up to about 5 mg by weight, more typically about 0.01 mg to about 3 mg, of active enzyme per gram of the composition. Stated otherwise, the compositions herein will typically comprise from about 0.001% to about 5%, preferably 0.01%–1% by weight of a commercial enzyme preparation. Protease enzymes are usually present in such commercial preparations at levels sufficient to provide from 0.005 to 0.1 Anson units (AU) of activity per gram of composition.

Suitable examples of proteases are the subtilisins which are obtained from particular strains of *B. subtilis* and *B. licheniformis*. Another suitable protease is obtained from a strain of Bacillus, having maximum activity throughout the pH range of 8–12, developed and sold by Novo Industries A/S as ESPERASE®. The preparation of this enzyme and analogous enzymes is described in British Patent Specification No. 1,243,784 of Novo. Proteolytic enzymes suitable for removing protein-based stains that are commercially available include those sold under the tradenames ALCALASE® and SAVINASE® by Novo Industries A/S (Denmark) and MAXATASE® by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985).

An especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of *Bacillus amyloliquefaciens* subtilisin, as described in the patent applications of A. Baeck, et al, entitled "Protease-Containing Cleaning Compositions" having U.S. Ser. No. 08/322,676, and C. Ghosh, et al, "Bleaching Compositions Comprising Protease Enzymes" having U.S. Ser. No. 08/322,677, both filed Oct. 13, 1994, and also in WO 95/10615, published Apr. 20, 1995.

Amylases suitable herein include, for example, $\alpha$-amylases described in British Patent Specification No. 1,296,839 (Novo), RAPIDASE®, International Bio-Synthetics, Inc. and TERMAMYL®, Novo Industries.

Engineering of enzymes (e.g., stability-enhanced amylase) for improved stability, e.g., oxidative stability is known. See, for example J. Biological Chem., Vol. 260, No. 11, June 1985, pp 6518–6521. "Reference amylase" refers to a conventional amylase inside the scope of the amylase component of this invention. Further, stability-enhanced amylases, also within the invention, are typically compared to these "reference amylases".

The present invention, in certain preferred embodiments, can makes use of amylases having improved stability in detergents, especially improved oxidative stability. A convenient absolute stability reference-point against which amylases used in these preferred embodiments of the instant invention represent a measurable improvement is the stability of TERMAMYL® in commercial use in 1993 and available from Novo Nordisk A/S. This TERMAMYL® amylase is a "reference amylase", and is itself well-suited for use in the ADD (Automatic Dishwashing Detergent) compositions of the invention. Even more preferred amylases herein share the characteristic of being "stability-enhanced" amylases, characterized, at a minimum, by a measurable improvement in one or more of: oxidative stability, e.g., to hydrogen peroxide/tetraacetylethylenediamine in buffered solution at pH 9–10; thermal stability, e.g., at common wash temperatures such as about 60° C.; or alkaline stability, e.g., at a pH from about 8 to about 11, all measured versus the above-identified reference-amylase. Preferred amylases herein can demonstrate further improvement versus more challenging reference amylases, the latter reference amylases being illustrated by any of the precursor amylases of which preferred amylases within the invention are variants. Such precursor amylases may themselves be natural or be the product of genetic engineering. Stability can be measured using any of the art-disclosed technical tests. See references disclosed in WO 94/02597, itself and documents therein referred to being incorporated by reference.

In general, stability-enhanced amylases respecting the preferred embodiments of the invention can be obtained from Novo Nordisk A/S, or from Genencor International.

Preferred amylases herein have the commonality of being derived using site-directed mutagenesis from one or more of the Baccillus amylases, especialy the Bacillus alpha-amylases, regardless of whether one, two or multiple amylase strains are the immediate precursors.

As noted, "oxidative stability-enhanced" amylases are preferred for use herein despite the fact that the invention makes them "optional but preferred" materials rather than essential. Such amylases are non-limitingly illustrated by the following:

(a) An amylase according to the hereinbefore incorporated WO/94/02597, Novo Nordisk A/S, published Feb. 3, 1994, as further illustrated by a mutant in which substitution is made, using alanine or threonine (preferably threonine), of the methionine residue located in position 197 of the *B. licheniformis* alpha-amylase, known as TERMAMYL®, or the homologous position variation of a similar parent amylase, such as *B. amyloliquefaciens, B. subtilis,* or *B. stearothermophilus;*

(b) Stability-enhanced amylases as described by Genencor International in a paper entitled "Oxidatively Resistant alpha-Amylases" presented at the 207th American Chemical Society National Meeting, Mar. 13–17 1994, by C. Mitchinson. Therein it was noted that bleaches in automatic dishwashing detergents inactivate alpha-amylases but that improved oxidative stability amylases have been made by Genencor from *B. licheniformis* NCIB8061. Methionine (Met) was identified as the most likely residue to be modified. Met was substituted, one at a time, in positions 8,15,197,256,304,366 and 438 leading to specific mutants, particularly important being M197L and M197T with the M197T variant being the most stable expressed variant. Stability was measured in CASCADE® and SUNLIGHT®;

(c) Particularly preferred herein are amylase variants having additional modification in the immediate parent available from Novo Nordisk A/S. These amylases include those commercially marketed as DURAMYL by NOVO; bleach-stable amylases are also commercially available from Genencor.

Any other oxidative stability-enhanced amylase can be used, for example as derived by site-directed mutagenesis from known chimeric, hybrid or simple mutant parent forms of available amylases.

Cellulases usable in, but not preferred, for the present invention include both bacterial or fungal cellulases. Typically, they will have a pH optimum of between 5 and 9.5. Suitable cellulases are disclosed in U.S. Pat. No. 4,435,307, Barbesgoard et al, issued Mar. 6, 1984, which discloses fungal cellulase produced from *Humicola insolens* and Humicola strain DSM1800 or a cellulase 212-producing fungus belonging to the genus Aeromonas, and cellulase extracted from the hepatopancreas of a marine mollusk (*Dolabella Auricula Solander*). Suitable cellulases are also disclosed in GB-A-2.075.028; GB-A-2.095.275 and DE-OS-2.247.832. CAREZYME® (Novo) is especially useful.

Suitable lipase enzymes for detergent use include those produced by microorganisms of the Pseudomonas group, such as *Pseudomonas stutzeri* ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex *Chromobacter viscosum,* e.g. *Chromobacter viscosum* var. *lipolyticum* NRRLB 3673, commercially available from Toyo Jozo Co., Tagata, Japan; and further *Chromobacter viscosum* lipases from U.S. Biochemical Corp., U.S.A. and Disoynth Co., The Netherlands, and lipases ex *Pseudomonas gladioli.* The LIPOLASE® enzyme derived from *Humicola lanuginosa* and commercially available from Novo (see also EPO 341,947) is a preferred lipase for use herein. Another preferred lipase enzyme is the D96L variant of the native Humicola lanuginosa lipase, as described in WO 92/05249 and Research Disclosure No. 35944, Mar. 10, 1994, both published by Novo. In general, lipolytic enzymes are less preferred than amylases and/or proteases for automatic dishwashing embodiments of the present invention.

Peroxidase enzymes can be used in combination with oxygen sources, e.g., percarbonate, perborate, persulfate, hydrogen peroxide, etc. They are typically used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S. The present invention encompasses peroxidase-free automatic dishwashing composition embodiments.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

Other Ingredients

Usual ingredients can include one or more materials for assisting or enhancing cleaning performance, treatment of the substrate to be cleaned, or to modify the aesthetics of the composition. Usual detersive adjuncts of detergent compositions include the ingredients set forth in U.S. Pat. No. 3,936,537, Baskerville et al. Adjuncts which can also be included in the compositions employed in the present invention, in their conventional art-established levels for use (generally from 0% to about 20% of the detergent ingredients, preferably from about 0.5% to about 10%), include other active ingredients such as enzyme stabilizers, color speckles, anti-tarnish and/or anti-corrosion agents, dyes, fillers, optical brighteners, germicides, alkalinity sources, hydrotropes, anti-oxidants, enzyme stabilizing agents, perfumes, dyes, solubilizing agents, clay soil removal/anti-redeposition agents, carriers, processing aids, pigments, solvents for liquid formulations, fabric softeners, static control agents, solid fillers for bar compositions, etc. Dye transfer inhibiting agents, including polyamine N-oxides such as polyvinylpyridine N-oxide can be used. Dye-transfer-inhibiting agents are further illustrated by polyvinylpyrrolidone and copolymers of N-vinyl imidazole and N-vinyl pyrrolidone. If high sudsing is desired, suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, typically, 0.1%–2%, to provide additional suds and to enhance grease removal performance.

Liquid Compositions

The present invention comprises both liquid and granular compositions including the aforementioned ingredients. Liquid compositions, including gels, typically contain some water and other fluids as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5% to 90%, typically 10% to 50% of such carriers. Liquid compositions according to the present invention may be formulated acidic to deliver an in-use alkaline pH. Low pH formulation is generally from about 2 to about 5 and preferably from about 2.5 to about 4.5. In-use pH is may range from about 7 to about 11, preferably from about 9.5 to about 10.5.

Emulsifying System

Liquid compositions of the present invention may also typically include an emulsifying system or a thickening system. The emulsifying or thickening system provides suitable storage length and stability profiles. An emulsifying system is typically employed for activators which are liquids or have been previously dissolved. The emulsifying system is generally present in amounts of from about 0.1% to about 60% by weight of the composition, preferably between about 2 and 30% and more preferably between about 3 and 25% by weight of the composition. The emulsifying system is selected to provide an HLB or hydrophile-lipophile balance that is compatible to the HLB requirement of the unsymmetrical acyclic imide activator as defined above. For the unsymmetrical acyclic imide activators as defined above, the HLB value of the emulsifying system of the present invention will typically range from about 6 to about 16, and more preferably from about 7 to about 15. However, in instances when the unsymmetrical acyclic imide activator is first dissolved in a solvent, the HLB of the emulsifying system will be selected to be compatible to the solvent plus activator system.

The emulsifying system of the present invention may be composed of a nonionic surfactant, mixtures of nonionic surfactants or mixtures of anionic and nonionic surfactants. Preferably, the emulsifying system is a nonionic surfactant or mixtures of nonionic surfactants. When employing mixtures of surfactants as the emulsifying system, it is the HLB value for the mixture that is employed as the HLB of the emulsifying system.

The hydrophile-lipophile balance is an expression of the relative simultaneous attraction of an emulsifier for water and for oil (or the two phases of the emulsion system being considered). The HLB value for a given compound is generally determined by the chemical composition and extent of ionization. The value may be determined in a number of ways, the easiest of which is the chemical composition by various formula's. The various means to calculate HLB are well-known to those of skill in the art and are disclosed, for instance, in Nonionic Surfactants, Physical Chemistry, from Marcel Dekker, Inc, volume 23, 1987, pp 438–456 and Emulsions and Emulsion Technology, part I, volume 6 of the Surfactant Science Series, 1974, pp 264–269.

The preferred emulsifiers for use in the emulsifying system of the present invention are alkyl alkoxylate nonionic surfactants such as alkoxylated fatty alcohols. A large number of alkoylated fatty alcohols are commercially available with varying HLB values. The HLB values of such alkoylated nonionic surfactants depend essentially on the chain length of the fatty alcohol, the nature of alkoxylation and the degree of alkoxylation. Nonionic surfactants which are most preferred in the present invention are ethoxylated fatty alcohols. The alcohols can be of natural or petrochemical origin and both branched or straight chained. Suitable ethoxylated fatty alcohol nonionic surfactants for use in the emulsifying system of the present invention are commercially available under the tradenames DOBANOL and NEODOL available from the Shell Oil Company of Houston, Tex.

Thickening System

The liquid compositions of the present invention may also include a thickening system. Thickening systems are typically employed for activators which are solids or in particle form. Particle sizes of the activator generally range from about 0.1 to about 1,000 microns, preferably from about 1 to about 500 microns, an more preferably from about 1 to about 250 microns. The thickening system then comprises a rheology capable of suspending the particulate activator in the liquid composition.

Those skilled in the art will realize that, in the simplest case, a rheology capable of suspending solids is simply a viscosity sufficient to prevent settling, creaming, floccing, etc., of the particles being suspended. The required viscosity will vary according to particle size but should generally be greater than about 300 cps (measured at 10 rpm) preferably greater than 600 cps and more preferably still greater than 1000 cps. It will further be realized by those skilled in the art the rheology will preferably be that of a non-Newtonian, shear thinning fluid. Such fluids exhibit very high viscosities at low shear with viscosity reducing as shear is increased e.g. a shear thinning fluid may have a viscosity of 2000 cps at 10 rpm but only 500 cps at 100 rpm. Such shear thinning systems may be obtained in several ways including the use of associative polymeric thickeners, emulsions and specific surfactant systems.

Coating

Various detersive ingredients employed in the present compositions optionally can be further stabilized by absorbing the ingredients onto a porous hydrophobic substrate, then coating the substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT®D 10, Degussa) is admixed with a proteolytic enzyme solution containing 3%–5% of $C_{13-15}$ ethoxylated alcohol (EO 7) nonionic surfactant. Typically, the enzyme/surfactant solution is 2.5× the weight of silica. The resulting powder is dispersed with stirring in silicone oil (various silicone oil viscosities in the range of 500–12,500 can be used). The resulting silicone oil dispersion is emulsified or otherwise added to the final detergent matrix. By this means, ingredients such as the aforementioned enzymes, hydrogen peroxide sources, bleach activators, bleach catalysts, photoactivators, dyes, fluorescers, fabric conditioners and hydrolyzable surfactants can be "protected" for use in detergents, including liquid laundry detergent compositions. Alternate forms of coating particles, such as for example wax encapsulation, are disclosed in U.S. Pat. Nos. 4,087,369, 5,230,822 and 5,200,236.

Bar Compositions

The bleaching and bleach additive compositions of the present invention may also be employed in laundry or cleaning bar forms. Bar forms typically include a surfactant which may include both soap and synthetic detergent or be all synthetic in terms of the surfactant content, in conjunction with a suitable source of hydrogen peroxide and the imide bleach activators of the present invention. Of course one of ordinary skill in the art will recognize that the levels of surfactant, peroxide source and imide activator may vary widely. One such bar composition according to the present invention comprises from about 10% to about 90% surfactant (including soap or mixtures thereof with conventional synthetic surfactants, from about 0.1% to about 40% sodium perborate as peroxide source, from about 0.1% to about 20% imide activator of formula (I), from about 0.1% to about 50% builder, and optionally from about 0.1% to about 60% of organic or inorganic fillers such as talc, starch or the like. Suitable bar compositions and the methods of manufacture are disclosed in U.S. Pat. Nos. 4,151,105, 3,248,333, 5,340,492 and 5,496,488, the disclosures of which are herein incorporated by reference, and in Great Britain Application 2,096,163A.

Hard Surface Cleaning Compositions

The bleaching and bleach additive compositions of the present invention may also take the form of hard surface cleaning compositions. Hard surface cleaning compositions can in general be formulated identically with the bleach or bleach additive compositions described hereinabove, or may be formulated according to the more specialized art of hard surface cleaning, using for example, low-residue surfactants. As with other embodiments of the invention, the pH of such compositions may vary widely, depending upon the intended use of the composition. Suitable hard surface cleaning compositions useful in conjunction with the imide activator of the present invention are described in U.S. Pat. Nos. 5,536,450; 5,536,451; and 5,538,664 the disclosures of which are herein incorporated by reference. Of course, one of ordinary skill in the art will recognize that it is preferable to employ bleach-stable ingredients whenever formulating a source of hydrogen peroxide into the compositions.

Granular Compositions

The bleaching and bleach additive compositions of the present invention can be used in both low density (below 550 grams/liter) and high density granular compositions in which the density of the granule is at least 550 grams/liter. Granular compositions are typically designed to provide an in the wash pH of from about 7.5 to about 11.5, more preferably from about 9.5 to about 10.5. Low density compositions can be prepared by standard spray-drying processes. Various means and equipment are available to prepare high density compositions. Current commercial practice in the field employs spray-drying towers to manufacture compositions which have a density less than about 500 g/l. Accordingly, if spray-drying is used as part of the overall process, the resulting spray-dried particles must be further densified using the means and equipment described hereinafter. In the alternative, the formulator can eliminate spray-drying by using mixing, densifying and granulating equipment that is commercially available. The following is a nonlimiting description of such equipment suitable for use herein.

Various means and equipment are available to prepare high density (i.e., greater than about 550, preferably greater than about 650, grams/liter or "g/l"), high solubility, free-flowing, granular detergent compositions according to the present invention. Current commercial practice in the field employs spray-drying towers to manufacture granular laundry detergents which often have a density less than about 500 g/l. In this procedure, an aqueous slurry of various heat-stable ingredients in the final detergent composition are formed into homogeneous granules by passage through a spray-drying tower, using conventional techniques, at temperatures of about 175° C. to about 225° C. However, if spray drying is used as part of the overall process herein, additional process steps as described hereinafter must be used to obtain the level of density (i.e., >650 g/l) required by modem compact, low dosage detergent products.

For example, spray-dried granules from a tower can be densified further by loading a liquid such as water or a nonionic surfactant into the pores of the granules and/or subjecting them to one or more high speed mixer/densifiers. A suitable high speed mixer/densifier for this process is a device marketed under the tradename "Lödige CB 30" or "Lödige CB 30 Recycler" which comprises a static cylindrical mixing drum having a central rotating shaft with mixing/cutting blades mounted thereon. In use, the ingredients for the detergent composition are introduced into the drum and the shaft/blade assembly is rotated at speeds in the range of 100–2500 rpm to provide thorough mixing/densification. See Jacobs et al, U.S. Pat. No. 5,149,455, issued Sep. 22, 1992. The preferred residence time in the high speed mixer/densifier is from about 1 to 60 seconds. Other such apparatus includes the devices marketed under the tradename "Shugi Granulator" and under the tradename "Drais K-TTP 80").

Another process step which can be used to densify further spray-dried granules involves grinding and agglomerating or deforming the spray-dried granules in a moderate speed mixer/densifier so as to obtain particles having lower intraparticle porosity. Equipment such as that marketed under the tradename "Lödige KM" (Series 300 or 600) or "Lödige Ploughshare" mixer/densifiers are suitable for this process step. Such equipment is typically operated at 40–160 rpm. The residence time of the detergent ingredients in the moderate speed mixer/densifier is from about 0.1 to 12 minutes. Other useful equipment includes the device which is available under the tradename "Drais K-T 160". This process step which employs a moderate speed mixer/densifier (e.g. Lödige KM) can be used by itself or sequentially with the aforementioned high speed mixer/densifier (e.g. Lödige CB) to achieve the desired density. Other types of granules manufacturing apparatus useful herein include the apparatus disclosed in U.S. Pat. No. 2,306,898, to G. L. Heller, Dec. 29, 1942.

While it may be more suitable to use the high speed mixer/densifier followed by the low speed mixer/densifier, the reverse sequential mixer/densifier configuration is also contemplated by the invention. One or a combination of various parameters including residence times in the mixer/densifiers, operating temperatures of the equipment, temperature and/or composition of the granules, the use of adjunct ingredients such as liquid binders and flow aids, can be used to optimize densification of the spray-dried granules in the process of the invention. By way of example, see the processes in Appel et al, U.S. Pat. No. 5,133,924, issued Jul. 28, 1992 (granules are brought into a deformable state prior to densification); Delwel et al, U.S. Pat. No. 4,637,891, issued Jan. 20, 1987 (granulating spray-dried granules with a liquid binder and aluminosilicate); Kruse et al, U.S. Pat. No. 4,726,908, issued Feb. 23, 1988 (granulating spray-dried granules with a liquid binder and aluminosilicate); and, Bortolotti et al, U.S. Pat. No. 5,160,657, issued Nov. 3, 1992 (coating densified granules with a liquid binder and aluminosilicate).

In those situations in which particularly heat sensitive or highly volatile detergent ingredients are to be incorporated into the final detergent composition, processes which do not include spray drying towers are preferred. The formulator can eliminate the spray-drying step by feeding, in either a continuous or batch mode, starting detergent ingredients directly into mixing/densifying equipment that is commercially available. One particularly preferred embodiment involves charging a surfactant paste and an anhydrous builder material into a high speed mixer/densifier (e.g. Lödige CB) followed by a moderate speed mixer/densifier (e.g. Lödige KM) to form high density detergent agglomerates. See Capeci et al, U.S. Pat. No. 5,366,652, issued Nov. 22, 1994 and Capeci et al, U.S. Pat. No. 5,486,303, issued Jan. 23, 1996. Optionally, the liquid/solids ratio of the starting detergent ingredients in such a process can be selected to obtain high density agglomerates that are more free flowing and crisp.

Optionally, the process may include one or more recycle streams of undersized particles produced by the process which are fed back to the mixer/densifiers for further agglomeration or build-up. The oversized particles produced by this process can be sent to grinding apparatus and then fed back to the mixing/densifying equipment. These additional recycle process steps facilitate build-up agglomeration of the starting detergent ingredients resulting in a finished composition having a uniform distribution of the desired particle size (400–700 microns) and density (>550 g/l). See Capeci et al, U.S. Pat. No. 5,516,448, issued May 14, 1996 and Capeci et al, U.S. Pat. No. 5,489,392, issued Feb. 6, 1996. Other suitable processes which do not call for the use of spray-drying towers are described by Bollier et al, U.S. Pat. No. 4,828,721, issued May 9, 1989; Beerse et al, U.S. Pat. No. 5,108,646, issued Apr. 28, 1992; and, Jolicoeur, U.S. Pat. No. 5,178,798, issued Jan. 12, 1993.

In yet another embodiment, the high density detergent composition of the invention can be produced using a fluidized bed mixer. In this process, the various ingredients of the finished composition are combined in an aqueous slurry (typically 80% solids content) and sprayed into a fluidized bed to provide the finished detergent granules.

Prior to the fluidized bed, this process can optionally include the step of mixing the slurry using the aforementioned L ödige CB mixer/densifier or a "Flexomix 160" mixer/densifier, available from Shugi. Fluidized bed or moving beds of the type available under the tradename "Escher Wyss" can be used in such processes.

Another suitable process which can be used herein involves feeding a liquid acid precursor of an anionic surfactant, an alkaline inorganic material (e.g. sodium carbonate) and optionally other detergent ingredients into a high speed mixer/densifier (residence time 5–30 seconds) so as to form agglomerates containing a partially or totally neutralized anionic surfactant salt and the other starting detergent ingredients. Optionally, the contents in the high speed mixer/densifier can be sent to a moderate speed mixer/densifier (e.g. Lödige KM) for further agglomeration resulting in the finished high density detergent composition. See Appel et al, U.S. Pat. No. 5,164,108, issued Nov. 17, 1992.

Optionally, high density detergent compositions according to the invention can be produced by blending conventional or densified spray-dried detergent granules with detergent agglomerates in various proportions (e.g. a 60:40 weight ratio of granules to agglomerates) produced by one or a combination of the processes discussed herein. Additional adjunct ingredients such as enzymes, perfumes, brighteners and the like can be sprayed or admixed with the agglomerates, granules or mixtures thereof produced by the processes discussed herein. Bleaching compositions in granular form typically limit water content, for example, to less than about 7% free water, for best storage stability.

The bleaching compositions of the present invention are ideally suited for use in laundry applications and automatic dishwashing compositions. Bleach additive compositions are intended to be employed in conjunction with a source of hydrogen peroxide such as a bleaching composition or a bleaching composition including a detergent, e.g. TIDE® WITH BLEACH. Accordingly, the present invention includes a method for laundering a soiled fabric. The method includes contacting a fabric to be laundered with an aqueous laundry liquor. The fabric may comprise most any fabric capable of being laundered in normal consumer use conditions. The laundry liquor includes the added bleach additive or bleaching composition containing a unsymmetrical acyclic imide activator as fully described above. The laundry liquor may also include any of the above described additives to the compositions such as hydrogen peroxide source, detersive surfactants, chelates, and detersive enzymes. The compositions are preferably employed at concentrations of at least about 50 ppm and typically from about 1,000 to about 10,000 ppm in solution. The water temperatures preferably range from about 25° C. to about 50° C. The water to fabric ratio is preferably from about 1:1 to about 15:1

Methods for washing soiled dishes such as tableware, also involve contacting the soiled dishes with an aqueous dishwashing liquor. The dishwashing liquor includes the added bleach additive or bleaching composition containing an unsymmetrical acyclic imide activator as fully described above. The dishwashing liquor may also include any of the above described additives to the compositions such as hydrogen peroxide source, detersive surfactants, chelates, and detersive enzymes. The compositions are preferably employed at concentrations of at least about 50 ppm and typically from about 1,000 to about 10,000 ppm in solution. The water temperatures preferably range from about 25° C. to about 50° C.

The present invention will now be described by reference to the following examples. Of course, one of ordinary skill in the art will recognize that the present invention is not limited to the specific examples herein described or the ingredients and steps contained therein, but rather, may be practiced according to the broader aspects of the disclosure.

EXAMPLE I

Preparation of N-Nonanoyl-N-methyl Acetamide

All glassware is dried thoroughly, and the reaction is kept under an inert atmosphere (argon) at all times. In a 3-neck, round bottom flask equipped with a mechanical stirrer, 45.1 mL (0.25 mol) of nonanoyl chloride (available from Aldrich Chemical Company, Inc. of Milwaukee, Wis.) is dissolved in 150 mL of $CH_2Cl_2$ (available from Aldrich Chemical). The resulting solution is cooled to −40° C. in a $CH_3CN/CO_2$ bath, and 22.0 mL (0.275 mol) of pyridine (available from Aldrich Chemical) is added in one portion. The reaction mixture is stirred continuously for 20 minutes during which time a precipitate is formed. With stirring, 19.0 mL (0.25 mol) of N-methyl acetamide (available from Aldrich Chemical) is then added in one portion, and the resulting reaction mixture is warmed gradually to room temperature and is stirred for 3 days. The reaction is diluted with 150 mL of $CH_2C_{12}$, and extracted twice with 150 mL of 1 N HCl, twice with 0.1 N aqueous NaOH, and twice with neutral D.I. water. The organic layer is dried over $Na_2SO_4$, filtered, and the solvent removed by evaporation under reduced pressure to yield 49.7 g (93%) of a product. Vacuum distillation of the product yields 29.2 g (60%) of N-nonanoyl-N-methyl acetamide.

EXAMPLE II

Preparation of N-Octanoyl-N-methyl Acetamide

The procedure is the same as in EXAMPLE I except that octanoyl chloride (available from Aldrich Chemical) is substituted for nonanoyl chloride.

EXAMPLE III

Preparation of N-Decanoyl-N-methyl Acetamide

The procedure is the same as in EXAMPLE I except that decanoyl chloride (available from Aldrich Chemical) is substituted for nonanoyl chloride.

EXAMPLE IV

Preparation of N-Lauroyl-N-methyl Acetamide

The procedure is the same as in EXAMPLE I except that lauroyl chloride (available from Aldrich Chemical) is substituted for nonanoyl chloride.

EXAMPLE V

Preparation of N-Myristoyl-N-methyl Acetamide

The procedure is the same as in EXAMPLE II except that myristoyl chloride (available from Aldrich Chemical) is substituted for nonanoyl chloride.

EXAMPLE VI

Bleaching compositions having the form of granular laundry detergents are exemplified by the following formulations.

| INGREDIENT | A % | B % | C % | D % | E % |
|---|---|---|---|---|---|
| Bleach Activator* | 5 | 3.5 | 1 | 3.5 | 2 |
| Sodium Percarbonate | 0 | 0 | 19 | 21 | 0 |
| Sodium Perborate monohydrate | 21 | 0 | 0 | 0 | 20 |
| Sodium Perborate tetrahydrate | 12 | 21 | 0 | 0 | 0 |
| Tetraacetylethylene-diamine | 0 | 0 | 0 | 1 | 0 |
| Nonanoyloxybenzene-sulfonate | 0 | 0 | 3 | 0 | 0 |
| Linear alkylbenzene-sulfonate | 5.5 | 11 | 19 | 12 | 9.5 |
| Alkyl ethoxylate (C45E7) | 4 | 0 | 3 | 4 | 6 |
| Zeolite A | 20 | 20 | 9.5 | 17 | 21 |
| SKS-6 ® silicate (Hoechst) | 0 | 0 | 11 | 11 | 0 |
| Trisodium citrate | 5 | 5 | 2 | 3 | 3 |
| Acrylic Acid/Maleic Acid copolymer | 4 | 0 | 4 | 5 | 0 |
| Sodium polyacrylate | 0 | 3 | 0 | 0 | 3 |
| Diethylenetriamine penta(methylene phosphonic acid) | 0.4 | 0 | 0.4 | 0 | 0 |
| DTPA | 0 | 0.4 | 0 | 0 | 0.4 |
| EDDS | 0 | 0 | 0 | 0.3 | 0 |
| Carboxymethylcellulose | 0.3 | 0 | 0 | 0.4 | 0 |
| Protease | 1.4 | 0.3 | 1.5 | 2.4 | 0.3 |
| Lipolase | 0.4 | 0 | 0 | 0.2 | 0 |
| Carezyme | 0.1 | 0 | 0 | 0.2 | 0 |
| Anionic soil release polymer | 0.3 | 0 | 0 | 0.4 | 0.5 |
| Dye transfer inhibiting polymer | 0 | 0 | 0.3 | 0.2 | 0 |
| Carbonate | 16 | 14 | 24 | 6 | 23 |
| Silicate | 3.0 | 0.6 | 12.5 | 0 | 0.6 |
| Sulfate, Water, Perfume, Colorants | to 100 | to 100 | to 100 | to 100 | to 100 |

*Bleach activator according to any of Examples I–V

EXAMPLE VII

This Example illustrates bleaching compositions, more particularly, liquid bleach additive compositions in accordance with the invention.

| Ingredients | A wt % | B wt % | C wt % | D wt % |
|---|---|---|---|---|
| NEODOL 91-10[1] | 6 | 11.1 | 7 | 4 |
| NEODOL 45-7[1] | 6 | 3.9 | 5 | 8 |
| NEODOL 23-2[1] | 3 | 0 | 3 | 3 |
| DTPA | .10 | .10 | .10 | .10 |
| Bleach Activator[2] | 3.5 | 3.5 | 2 | 7 |
| Citric Acid | 0.5 | 0.5 | 0.5 | 0.5 |
| NaOH | to pH 4 | to pH 4 | to pH 4 | to pH 4 |
| Hydrogen Peroxide | 6 | 3 | 2 | 7 |
| Water | Balance to 100% | Balance to 100% | Balance to 100% | Balance to 100% |

[1]Alkyl ethoxylate available from The Shell Oil Company.
[2]Bleach Activator according to any of Examples I–V.

The compositions are used as bleach boosting additive (to be used in ADDITION to a bleach OR non-bleach detergent such as TIDE®) in a wash test otherwise similar to that used in Example V. The additive is used at 1000 ppm, and the commercial detergent is used at 1000 ppm.

EXAMPLE VIII

This Example illustrates cleaning compositions having bleach additive form, more particularly, liquid bleach additive compositions without a hydrogen peroxide source in accordance with the invention.

| Ingredients | A wt % | B wt % | C wt % | D wt % |
|---|---|---|---|---|
| NEODOL 91-10[1] | 6 | 11.1 | 5.5 | 10 |
| NEODOL 45-7[1] | 6 | 3.9 | 4.5 | 0 |
| NEODOL 23-2[1] | 3 | 0 | 5.0 | 5 |
| DTPA | 0.1 | 0.1 | 0.1 | 0.1 |
| Bleach Activator[2] | 3.5 | 3.5 | 1.5 | 7 |
| Water | Balance to 100% | Balance to 100% | Balance to 100% | Balance to 100% |

[1]Alkyl ethoxylate available from The Shell Oil Company.
[2]Bleach Activator according to any of Examples I–V.

The compositions are used as bleach boosting additive (to be used in ADDITION to a bleach detergent such as TIDE® WITH BLEACH) in a wash test otherwise similar to that used in Example V. The additive is used at 1000 ppm, and the commercial detergent is used at 1000 ppm.

EXAMPLE IX

A granular automatic dishwashing detergent composition comprises the following.

| INGREDIENT | A wt % | B wt % | C wt % | D wt % |
|---|---|---|---|---|
| Bleach Activator (See Note 1) | 3.5 | 3.5 | 2 | 6.5 |
| Sodium Perborate Monohydrate (See Note 2) | 1.5 | 0 | 1.5 | 0 |
| Sodium Percarbonate (See Note 2) | 0 | 1.2 | 0 | 1.2 |
| Amylase (TERMAMYL ® from NOVO) | 1.5 | 2 | 2 | 2 |
| Dibenzoyl Peroxide | 0 | 0 | 0.8 | 0 |
| Transition Metal Bleach Catalyst (See Note 3) | 0 | 0.1 | 0.1 | 0 |
| Protease (SAVINASE ® 12 T, NOVO, 3.6% active protein) | 2.5 | 2.5 | 2.5 | 2.5 |
| Trisodium Citrate Dihydrate (anhydrous basis) | 7 | 15 | 15 | 15 |
| Citric Acid | 14 | 0 | 0 | 0 |
| Sodium Bicarbonate | 15 | 0 | 0 | 0 |
| Sodium Carbonate, anhydrous | 20 | 20 | 20 | 20 |
| BRITESIL H2O ®, PQ Corp. (as $SiO_2$) | 7 | 8 | 7 | 5 |
| Diethylenetriaminepenta-(methylenephosphonic acid), Na | 0 | 0 | 0 | 0.2 |
| Hydroxyethyldiphosphonate (HEDP), Sodium Salt | 0 | 0.5 | 0 | 0.5 |
| Ethylenediaminedisuccinate, Trisodium Salt | 0.1 | 0.3 | 0 | 0 |
| Dispersant Polymer (Accusol 480N) | 6 | 5 | 8 | 10 |
| Nonionic Surfactant (LF404, BASF) | 2.5 | 1.5 | 1.5 | 1.5 |
| Paraffin (Winog 70 ®) | 1 | 1 | 1 | 0 |
| Benzotriazole | 0.1 | 0.1 | 0.1 | 0 |
| Sodium Sulfate, water, minors BALANCE TO: | 100% | 100% | 100% | 100% |

Note 1: Bleach Activator according to any of Examples I–V.
Note 2: These hydrogen peroxide sources are expressed on a weight % available oxygen basis. To convert to a basis of percentage of the total composition, divide by about 0.15.
Note 3: Transition Metal Bleach Catalyst: Pentaamineacetatocobalt (III) nitrate; may be replaced by MnTACN.

EXAMPLE X

Cleaning compositions having liquid form especially useful for cleaning bathtubs and shower tiles without being harsh on the hands are as follows:

| Ingredient | % (wt.) A | B |
|---|---|---|
| Bleach Activator* | 7.0 | 5.0 |
| Hydrogen Peroxide | 10.0 | 10.0 |
| $C_{12}$AS, acid form, partially neutralized | 5.0 | 5.0 |
| $C_{12-14}AE_3S$, acid form, partially neutralized | 1.5 | 1.5 |
| $C_{12}$ DimethylAmine N-Oxide | 1.0 | 1.0 |
| DEQUEST 2060 | 0.5 | 0.5 |
| Citric acid | 5.5 | 6.0 |
| Abrasive (15–25 micrometer) | 15.0 | 0 |
| HCL | to pH 4 | |
| Filler and water | Balance to 100% | |

*Bleach Activator according to any of Examples I–V.

EXAMPLE XI

Liquid bleaching compositions for cleaning typical househould surfaces are as follows. The hydrogen peroxide is separated as an aqueous solution from the other components by a suitable means such as a dual chamber container.

| Component | A (wt %) | B (wt %) |
|---|---|---|
| $C_{8-10}E_6$ nonionic surfactant | 20 | 15 |
| $C_{12-13}E_3$ nonionic surfactant | 4 | 4 |
| $C_8$ alkyl sulfate anionic surfactant | 0 | 7 |
| $Na_2CO_3/NaHCO_3$ | 1 | 2 |
| $C_{12-18}$ Fatty Acid | 0.6 | 0.4 |
| Hydrogen peroxide | 7 | 7 |
| Bleach Activator* | 7 | 7 |
| Dequest 2060** | 0.05 | 0.05 |
| $H_2O$ | Balance to 100 | Balance to 100 |

*Bleach Activator according to any of Examples I–V.
**Commercially available from Monsanto Co.

EXAMPLE XII

A laundry bar suitable for hand-washing soiled fabrics is prepared by standard extrusion processes and comprises the following:

| Component | Weight % |
|---|---|
| Bleach Activator* | 4 |
| Sodium Perborate Tetrahydrate | 12 |
| $C_{12}$ linear alkyl benzene sulfonate | 30 |
| Phosphate (as sodium tripolyphosphate) | 10 |
| Sodium carbonate | 5 |
| Sodium pyrophosphate | 7 |
| Coconut monoethanolamide | 2 |
| Zeolite A (0.1–10 micron) | 5 |
| Carboxymethylcellulose | 0.2 |
| Polyacrylate (m.w. 1400) | 0.2 |
| Brightener, perfume | 0.2 |
| Protease | 0.3 |
| $CaSO_4$ | 1 |
| $MgSO_4$ | 1 |

-continued

| Component | Weight % |
|---|---|
| Water | 4 |
| Filler** | Balance to 100% |

*Bleach activator according to any of Examples I–V
**Can be selected from convenient materials such as $CaCO_3$, talc, clay, silicates, and the like. Acidic fillers can be used to reduce pH. Fabrics are washed with the bar with excellent results.

What is claimed is:

1. A bleaching composition comprising:

i) from about 0.1% to about 70% by weight of the composition of an unsymmetrical imide bleach activator having the formula:

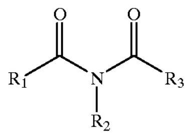

wherein $R_1$ is a $C_7$–$C_{13}$ linear or branched chain saturated or unsaturated alkyl group, $R_2$ is a $C_1$–$C_8$ linear or branched chain saturated or unsaturated alkyl group and $R_3$ is a $C_1$–$C_4$ linear or branched chain saturated or unsaturated alkyl group; and ii) from about 0.1% to about 70% by weight of the composition of a source of hydrogen peroxide.

2. The bleaching composition as claimed in claim 1 wherein $R_2$ is a $C_1$ to $C_4$ linear saturated alkyl group.

3. The bleaching composition as claimed in claim 1 wherein the sum of the number of carbon atoms in $R_1$, $R_2$ and $R_3$ of said activator is less than 19.

4. The bleaching composition as claimed in claim 1 wherein said composition further includes an ingredient selected from the group consisting of chelating agents, polymeric soil release agents, bleach catalysts, enzymes, builders and mixtures thereof.

5. The bleaching composition as claimed in claim 1 wherein said source of hydrogen peroxide is selected from the group consisting of perborate, percarbonate, hydrogen peroxide and mixtures thereof.

6. The bleaching composition as claimed in claim 1 wherein said composition is formulated as a microemulsion of said bleach activator in a matrix comprising water, said bleach activator, hydrogen peroxide source and a hydrophilic surfactant system comprising a nonionic surfactant.

7. The bleaching composition as claimed in claim 1, wherein said composition is formulated as an aqueous emulsion comprising at least a hydrophilic surfactant having an HLB above 10 and at least a hydrophobic surfactant having an HLB up to 9, wherein said bleach activator is emulsified by said surfactants.

8. The bleaching composition as claimed in claim 1, wherein said composition is formulated in granular form.

9. The bleaching composition as claimed in claim 1 wherein $R_1$ is a $C_7$–$C_{11}$ linear or branched saturated alkyl group.

10. The bleaching composition as claimed in claim 9 wherein $R_1$ is a $C_7$, $C_8$, $C_9$, $C_{10}$, or $C_{11}$ saturated alkyl group and $R_2$ and $R_3$ are $CH_3$.

11. The bleaching composition as claimed in claim 10 wherein $R_1$ is a linear $C_8$ or $C_9$ alkyl group and $R_2$ and $R_3$ are $CH_3$.

12. The bleaching composition as claimed in claim 1 wherein said composition comprises from about 0.1% to about 10% by weight of the composition of a surfactant selected from the group consisting of nonionic surfactants, cationic surfactants, anionic surfactants, zwitterionic surfactants, amphoteric surfactants and mixtures thereof.

13. The bleaching composition as claimed in claim 12 wherein said surfactant is a nonionic surfactant.

* * * * *